Feb. 5, 1963

M. A. MEISSER 3,076,305

TEXTILE SPINDLE CLUTCH

Filed Nov. 6, 1961

2 Sheets-Sheet 2

3,076,305
TEXTILE SPINDLE CLUTCH
Marc André Meisser, Petit Lancy, Geneva, Switzerland, assignor to Brevets Aero-Mecaniques S.A., Geneva, Switzerland, a society of Switzerland
Filed Nov. 6, 1961, Ser. No. 150,350
Claims priority, application Luxembourg Nov. 16, 1960
6 Claims. (Cl. 57—129)

The present invention relates to textile spindle machines provided with a clutch of the conical type, that is to say a friction clutch for coupling together a driving element and a driven element by engagement of a male conical element in a female conical element, the term "textile spindle machine" having a very broad meaning and including in particular not only spinning machines proper but also machines serving to similar operations, such as twisting machines and so on.

The invention is more especially but not exclusively concerned with machines wherein the spindle may have some oscillation within given limits, in particular when the speed of rotation of the spindle passes through some critical values.

The chief object of this invention is to provide a machine of this type which is better adapted to meet the requirements of practice than those used up to now, in particular concerning the conditions of operation of the clutch.

In such machines, the clutch comprises two cooperating elements adapted to be moved away from each other by a substantially axial displacement of one of said elements, which is generally the male conical element, against the action of resilient return means urging said elements toward cooperating contact with each other, this axial displacement being obtained by the action of a flat surface of an axially movable control member upon the opposite face of said movable clutch element.

According to a feature of the present invention, said control member is arranged in such manner as to have, in addition to the possibility of axial displacement, the possibility of a further displacement by rotation about a transverse axis, whereby the obtainment of a substantial contact area between the control member and the clutch element is made easier.

Figure 1:
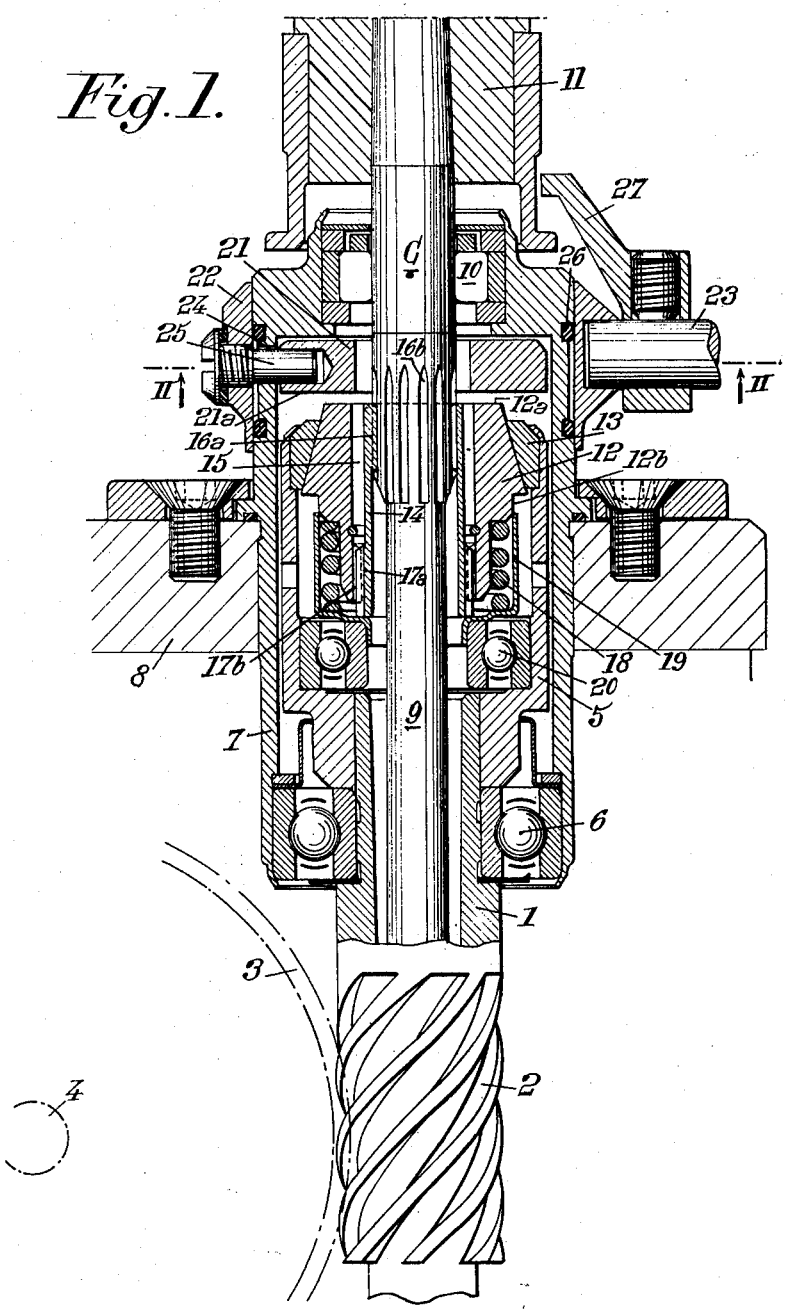
Figure 2:
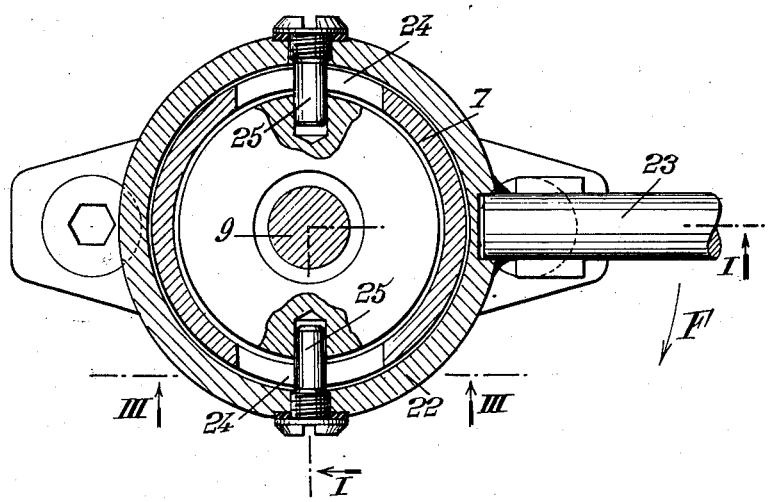
Figure 3:
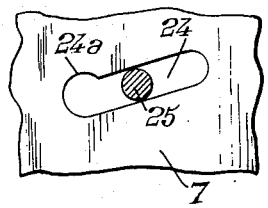

Other features of this invention will become apparent in the course of the following detailed description of a preferred embodiment thereof, given merely by way of example with reference to the appended drawings in which:

FIG. 1 shows in section on the line I—I of FIG. 2 a textile spindle machine made according to the invention;
FIG. 2 is a cross section on the line II—II of FIG. 1;
FIG. 3 is a sectional view on the line III—III of FIG. 2 showing a detail of the clutch control mechanism of the machine.

The spindle machine illustrated by the drawings is of the direct drive type.

A sleeve 1 comprising a worm 2 integral therewith is in mesh with a worm-wheel 3 fixed on a driving shaft 4 common to all the spindles of a row, this sleeve 1 carrying at its upper part a tubular extension 5. This sleeve is centered in an accurate manner by a lower bearing (not visible on the drawings) and an upper bearing 6 interposed between sleeve 1 and an external casing 7 intended to contain the clutch device, this casing being fixed rigidly to a frame 8 forming a support for a row of spindles.

A spindle 9 is mounted with some radial play in sleeve 1, the lower end of this spindle being supported by bearings (not shown) adapted to oscillate transversely within certain limits, spindle 9 being held in its upper portion by a bearing 10 interposed between said spindle and casing 7. This last mentioned bearing 10 is made to permit small movements of oscillation of the spindle about a center C located substantially at the level of said bearing 10.

The upper end of spindle 9 is fitted with a bobbin carrier 11 intended to receive the bobbins or cops which are to be mounted on said spindle.

In order to couple sleeve 1 with spindle 9, there is provided a conical clutch device housed in casing 7 and made in the following manner.

This clutch device comprises a male conical element 12 and a female conical element 13 adapted to be moved axially away from each other, the male element 12 being preferably the movable element of the clutch and the female element 13 being fixed in the axial direction. Female element 13 is rigid with tubular extension 5.

The main clutch element 12 is coupled with spindle 9 through means permitting small oscillation movements of said spindle. Such means may consist for instance of a sleeve 14 housed in an axial bore 15 provided in clutch element 12 and which comprises, on the one hand, at its upper part, inner splines $16_a$ in mesh with corresponding splines $16_b$ carried by spindle 9 and, on the other hand, at its lower end, external splines $17_a$ in mesh with splines $17_b$ provided in the lower portion of the inner wall of bore 15. This double system of splines enables coupling piece 14 to work in the manner of a Cardan joint, that is to say to permit a slight misalignment between clutch 12 and spindle 9.

The male element 12 of the clutch is subjected to the action of a return spring 18 which tends to keep it engaged in the female clutch element 13. This spring 18 bears against the bottom of a cup-shaped member 19 disposed coaxially with respect to spindle 9 and free to rotate with respect to the driving extension 5, owing to the provision, between the base of said cup-shaped member and the inner wall of said extension, of a bearing 20 the inner track of which is rigid with cup-shaped member 19, said bearing acting as a thrust bearing.

In order to disengage the clutch elements from each other, that is to say to move conical element 12 in the downward direction, there is provided a control member such as a ring 21 movable axially and adapted to cooperate with main conical element 12 by engagement of a flat annular surface $21_a$ against the upper edge $12_a$ of said male element, the upper diameter of said element 12 being smaller than the upper diameter of female element 13 so that said edge $12_a$ projects above the top face of the female element when the two conical elements are in engagement with each other.

Control ring 21 is mounted in such manner as to have, in addition to the axial displacement necessary for pushing down male element 12, the possibility of at least one pivoting displacement about a transverse axis.

Thus, when control ring 21 comes into contact with clutch element 12, said ring may, if necessary, have a small angular displacement about said transverse axis to facilitate the obtainment of a substantial contact area between surfaces $21_a$ and $12_a$.

This possibility permits of obviating the difficulties due to a possible lack of parallelism between surfaces $21_a$ and $12_a$ which lack of parallelism may result in particular from relatively important machining tolerances or from a slightly oblique engagement of male element 12 in female element 13. This may occur in particular when male element 12 has, at the end of its upward displacement, a possibility of slight changes of direction, as it will be hereinafter explained.

Anyway, the obtainment of a substantial contact area between cooperating surfaces $21_a$ and $12_a$ reduces the risk of wear and tear of said surfaces, especially when control ring 21 is mounted, according to a feature of the invention, in such manner as to be prevented from rotating about its axis so that it serves to brake the rotation of the male clutch element 12 (and therefore of spindle 9) as soon as the clutch has been disengaged.

The mechanism for imparting an axial displacement to control ring 21 while enabling it to swing within some limits about a transverse axis, is advantageously made as shown by FIGS. 1 and 3.

The upper part of casing 7, which is of substantially cylindrical shape is surrounded by a ring 22 rotatable about the axis of said casing and provided with a radial lever 23. In two diametrally opposed regions of casing 7, there are two helical slots 24 extending over a height corresponding to the axial displacement necessary to disengage the male clutch element 12.

Ring 22 is connected to control ring 21 through radial pins 25 extending through the slots 24 of casing 7. Preferably, as shown, the common axis of pin 25 is perpendicular to control lever 23. The lower end of each of said helical slots 24 is provided with a locking notch $24_a$ adapted to cooperate with the corresponding pin 25 when the clutch element 12 is fully disengaged so that the operator can release lever 23.

According to another feature of the invention, male element 12, while being guided axially during most of its displacement toward female element 13 is capable of having, near the end of this displacement, slight changes of direction so as to fit more tightly in female element 13.

For this purpose, the base of said male element 12 is provided with a cylindrical guiding surface $12_b$ of a diameter very slightly smaller than the inner diameter of the cup-shaped member 19. The cylindrical side wall of said cup-shaped member is made of a height such that guiding surface $12_b$ is practically free from the cup-shaped member when the male clutch element is fully engaged in the female clutch element 13. But this cylindrical side wall cooperates with guiding surface $12_b$ as soon as the male element 12 has just started away from female element 13. It is thus possible to have a correct guiding of male element 12 during nearly the whole of the displacement thereof while giving said male element the possibility of fitting in a perfect manner in female element 13 by a small change of direction if this is made necessary by the relative positions of the male and female elements at the end of the clutch engagement. It should be noted that, in order to avoid leakage of oil vapors through slot 24 provided in casing 7, it is advantageous to provide packing joints 26 between said casing and the inner wall of operating ring 22.

In order to disengage the clutch, lever 23 is rotated in the direction of arrow F of FIG. 2 so that, through the action of pins 25, control ring 21 is moved in the downward direction and male element 12 is moved away from female element 13 against the action of return spring 18. Movement of lever 23 in the opposed direction permits reengagement of said male element 12 and female element 13 under the action of spring 18. It should be noted that lever 23 advantageously carries a hook-shaped extension 27 adapted to retain the cop carrier 11 when a cop is being removed, this piece 27 being retractable, for instance by sliding, so as to permit, when so desired, of removing the cop carrier 11.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A textile spindle machine which comprises, in combination, a frame, a spindle rotatable in said frame, a clutch device including two conical elements, a male one and a female one, mounted along a common axis and adapted to cooperate together, one of said clutch elements being journalled in said frame so as to be fixed with respect thereto in the direction of said axis, means carried by said frame and operatively connected with said last mentioned clutch element for driving it in rotation, the other of said clutch elements being movable with respect to said frame in the direction of said axis, means for operatively connecting said spindle with said second mentioned clutch element so that said spindle is driven by said second clutch element, resilient means operatively connected with said second clutch element for urging it in one direction to apply it against said first mentioned clutch element, said second clutch element having an annular surface transverse to said axis, a control member having an annular surface coaxial with said clutch elements and transverse to said axis, said last mentioned annular surface being adapted to cooperate with said second clutch element's annular surface to push said second clutch element axially away from said first clutch element, and operating means movably mounted on said frame for moving said control member in the direction of said axis toward said second clutch element, said control member being rotatable about at least one axis transverse to said first mentioned axis.

2. A machine according to claim 1 wherein said control member is operatively connected with respect to said frame so as to be guided with respect thereto with a helical movement about said first mentioned axis, said operating means being arranged to rotate said control member about said axis in the direction that causes said member to move toward said second mentioned clutch element.

3. A machine according to claim 1 wherein said first mentioned clutch element is the female element of the clutch device.

4. A machine according to claim 1 comprising means for preventing rotation of said control member about said first mentioned axis when said two surfaces are in contact with each other, whereby rotation of said second mentioned clutch element is braked when the clutch elements are moved out of contact with each other.

5. A textile spindle machine which comprises, in combination, a frame, a spindle rotatable in said frame, a clutch device including two conical elements, a male one and a female one, mounted along a common axis and adapted to cooperate together, one of said clutch elements being journalled in said frame so as to be fixed with respect thereto in the direction of said axis, means carried by said frame and operatively connected with said last mentioned clutch element for driving it in rotation, the other of said clutch elements being movable with respect to said frame in the direction of said axis, means for operatively connecting said spindle with said second mentioned clutch element so that said spindle is driven by said second clutch element, resilient means operatively connected with said second clutch element for urging it in one direction to apply it against said first mentioned clutch element, means for guiding said second mentioned clutch element to hold it in aligned position along said axis for most of the displacement of said second clutch element toward said first mentioned clutch element while leaving said second clutch element free to engage the first clutch element in a perfect manner by a small change of the direction of the axis of said second clutch element.

6. A machine according to claim 5 wherein the last mentioned means consist of a cup-shaped member supported by said frame, said cup-shaped member having a cylindrical wall adapted to engage a cylindrical side wall of said second clutch element, said cylindrical wall of the guiding means being dimensioned to release said side wall of said second clutch element when the two clutch elements are going to engage each other.

References Cited in the file of this patent

UNITED STATES PATENTS

| | | |
|---|---|---|
| 1,852,067 | Stewart et al. | Apr. 5, 1932 |
| 2,126,760 | Eason | Aug. 16, 1938 |